(12) United States Patent
Chen et al.

(10) Patent No.: US 6,473,789 B1
(45) Date of Patent: Oct. 29, 2002

(54) NOTEBOOK/DESKTOP DOCKING SYSTEM ALLOWING BOTH PERIPHERAL SHARING AND PARALLEL PROCESSING

(75) Inventors: Chung Hui Chen; Sheng-Hsin Lo, both of Taipei (TW)

(73) Assignee: Inventec Corporation (TW)

( * ) Notice: Subject to any disclaimer, the term of this patent is extended or adjusted under 35 U.S.C. 154(b) by 0 days.

(21) Appl. No.: 09/447,706

(22) Filed: Nov. 23, 1999

(51) Int. Cl.[7] .................. G06F 15/167; G06F 15/00; G06F 13/00
(52) U.S. Cl. ................ 709/213; 712/29; 710/303
(58) Field of Search ............. 710/36, 40, 240–241, 710/300, 303–306, 309, 314; 711/147–148, 150; 712/28, 29; 709/204, 208, 211, 213, 216

(56) References Cited

U.S. PATENT DOCUMENTS

| 5,579,528 A | * | 11/1996 | Register ................ 708/104 |
| 5,625,829 A | * | 4/1997 | Gephardt et al. ............ 700/75 |
| 5,745,733 A | * | 4/1998 | Robinson .................. 709/209 |
| 5,867,728 A | * | 2/1999 | Melo et al. ................ 710/104 |
| 5,875,094 A | * | 2/1999 | Kirkendoll ................ 361/686 |
| 5,877,882 A | * | 3/1999 | Green et al. ................ 206/379 |
| 5,999,997 A | * | 12/1999 | Pipes ...................... 710/10 |
| 6,021,452 A | * | 3/2000 | Birch et al. ................ 700/75 |
| 6,044,452 A | * | 3/2000 | Birch et al. ................ 710/303 |
| 6,131,114 A | * | 10/2000 | Guezou et al. ............. 709/216 |

FOREIGN PATENT DOCUMENTS

EP        0693731 A1   * 12/1995

* cited by examiner

Primary Examiner—Andrew Caldwell
(74) Attorney, Agent, or Firm—Peter F. Corless; Steven M. Jensen; Edwards & Angell, LLP

(57) ABSTRACT

A computer coupling device is provided for coupling together two computer systems, such as a notebook computer and a desktop computer, to allow each computer to share the system resources of the other computer and to allow the two computer systems to perform dual-CPU parallel processing. When the notebook computer wants to gain access to the system resources of the desktop computer, the computer coupling device connects the host bus and the PCI bus of the notebook computer respectively to the host bus and the PCI bus of the desktop computer. Alternatively, when parallel processing is required, the computer coupling device connects the CPU of the notebook computer to the CPU of the desktop computer to allow the two CPUs to exchange data during dual-CPU parallel processing.

4 Claims, 2 Drawing Sheets

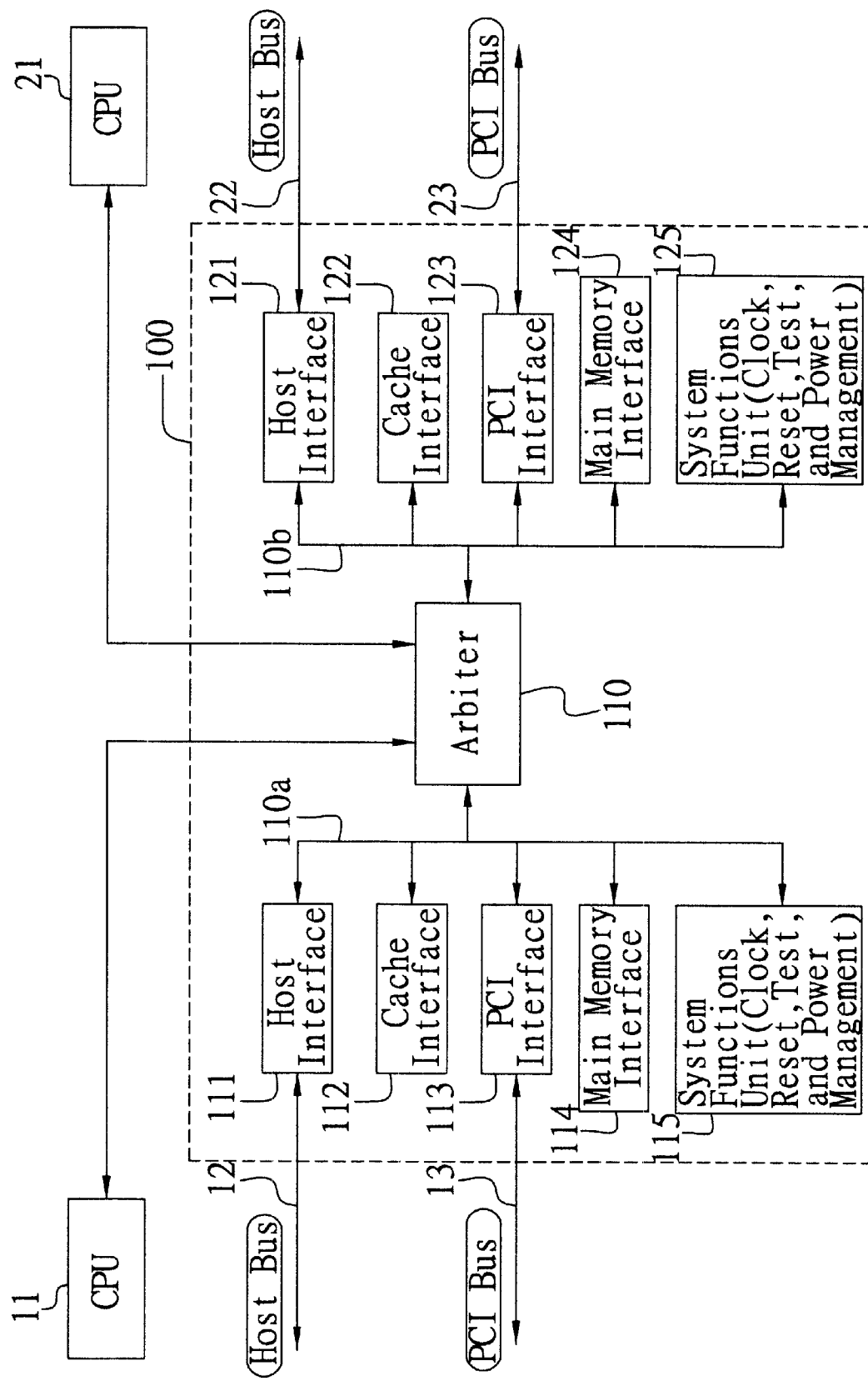

NOTEBOOK/DESKTOP DOCKING SYSTEM ALLOWING BOTH PERIPHERAL SHARING AND PARALLEL PROCESSING

BACKGROUND OF THE INVENTION

1. Field of the Invention

This invention relates to computer technology, and more particularly, to a computer coupling device capable of coupling together two computer systems, such as a notebook computer and a desktop computer, for the purpose of allowing each computer system to share the system resources of the other and also allowing the two respective CPUs of the two computer systems to be combined to perform a dual-CPU parallel processing task.

2. Description of Related Art

The notebook computer and the desktop computer are the two most widely used types of personal computer systems. Various kinds of peripheral devices have been designed for use with these two types of computer systems. However, since these two computer types are based on different specifications and standards, it would be infeasible to allow a peripheral device specifically designed for the notebook computer to be used by the desktop computer, and vice versa.

One solution to the foregoing problem is to link both the notebook computer and the desktop computer to a network hub, allowing each computer to gain access to the system resources of the other via the network hub. One drawback to this solution, however, is that the data exchange between the two computers is unsatisfactorily low since the network bandwidth is shared by many computers. Still one drawback is that it only allows the two computers to share system resources and unable to allow the respective CPUs of the two computers to be combined for parallel processing.

There exists, therefore, a need for a computer coupling device that can couple two computer systems together and allows each computer system to share the system resources of the other and also allows the respective CPUs of the two computer systems to be combined to perform the function of dual-CPU parallel processing.

SUMMARY OF THE INVENTION

It is therefore an objective of this invention to provide a computer coupling device for coupling two computer systems together, which allows each computer system to share the system resources of the other.

It is another objective of this invention to provide a computer coupling device for coupling two computer systems together, which allows the respective CPUs of the coupled computer systems to be combined to perform the function of dual-CPU parallel processing.

In accordance with the foregoing and other objectives, the invention proposes a novel computer coupling device. The computer coupling device of the invention is designed for use to couple a first computer system to a second computer system, with each of the first and second computer systems including a CPU, a Host bus, and a PCI bus, for the purpose of allowing each of the first and second computer systems to share the system resources of the other and the two respective CPUs on the first and second computer systems to be combined to perform the function of dual-CPU parallel processing. When the notebook computer wants to gain access to the system resources of the desktop computer, the computer coupling device connects the Host bus and the PCI bus of the notebook computer respectively to the Host bus and the PCI bus of the desktop computer. On the other hand, when a dual-CPU parallel processing task is desired, the computer coupling device connects the CPU of the notebook computer to the CPU of the desktop computer to allow the two CPUs to communicate with each other for exchange of data during the execution of the dual-CPU parallel processing

BRIEF DESCRIPTION OF DRAWINGS

The invention can be more fully understood by reading the following detailed description of the preferred embodiments, with reference made to the accompanying drawings, wherein:

FIG. 2 is a schematic diagram showing the inside block architecture of the computer coupling device of the invention.

DETAILED DESCRIPTION OF PREFERRED EMBODIMENTS

Figure 1:
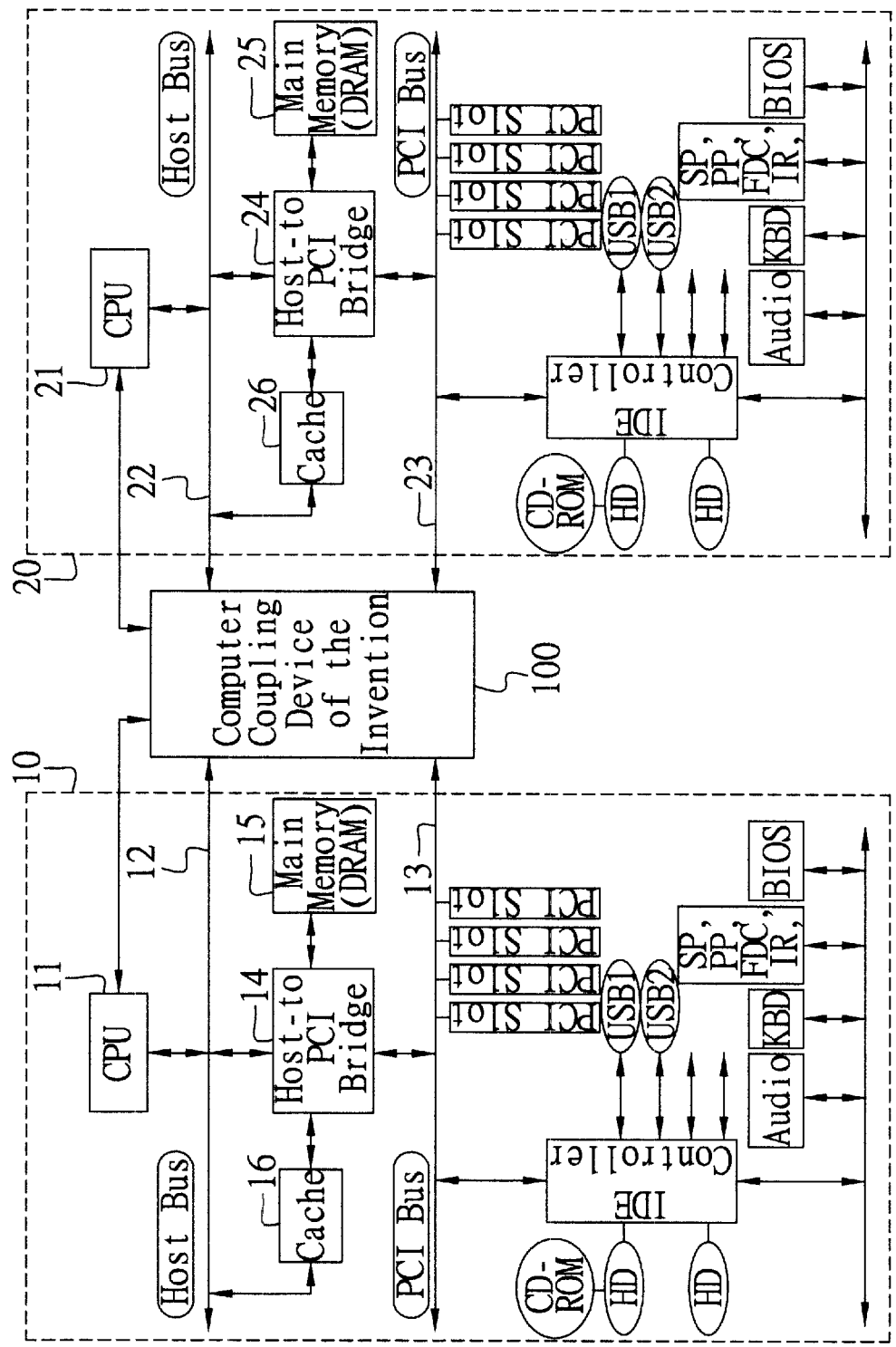
FIG. 1 is a schematic diagram showing the utilization of the computer coupling device of the invention when being used to couple together a notebook computer and a desktop computer.

FIG. 1 is a schematic diagram showing the utilization of the computer coupling device of the invention (as the block designated by the reference numeral 100) when being used to couple together a notebook computer (as the part designated by the reference numeral 10) and a desktop computer (as the part designated by the reference numeral 20). In practice, for example, the computer coupling device of the invention 100 can be implemented as a chipset installed in the desktop computer 20 and wired to a connector (not shown) for coupling with the notebook computer 10.

In the embodiment of FIG. 1, the invention is used for coupling together a notebook computer and a desktop computer. However, it is to be noted that the invention is not limited to this application; and broadly speaking, the invention can be used to couple a first computer system to a second computer system, with each of the first and second computer systems including a CPU, a Host bus, and a PCI bus, for the purpose of allowing each oft he first and second computer systems to share the system resources of the other and the two respective CPUs on the first and second computer systems to be combined to perform the function of dual-CPU parallel processing.

As shown in FIG. 1, the notebook computer 10 includes a CPU 11, a Host bus 12, a PCI (Peripheral Component Interconnect) bus 13, a Host-to-PCI bridge 14, a main memory unit (DRAM) 15, and a cache memory unit 16; wherein the PCI bus 13 is connected to a number of peripheral devices. Similarly, the desktop computer 20 includes a CPU 21, a Host bus 22, a PCI bus 23, a Host-to-PCI bridge 24, a main memory unit (DRAM) 25, and a cache memory unit 26; wherein the PCI bus 23 is connected to a number of peripheral devices.

With the computer coupling device of the invention 100, the notebook computer 10 can gain access to the system resources of the desktop computer 20 (i.e., the peripheral devices on the desktop computer 20) and vice versa. Moreover, the computer coupling device of the invention 100 can use the CPU 11 of the notebook computer 10 and the CPU 21 of the desktop computer 20 for dual-CPU parallel processing. For instance, when the user is operating the notebook computer 10 and wants to gain access to a peripheral device on the desktop computer 20, say the CD-ROM on the desktop computer 20, the computer coupling device of the invention 100 will connect the Host bus 12 and the PCI bus 13 of the notebook computer 10 respectively to the Host bus 22 and the PCI bus 23 of the desktop computer 20; and when the user wants the function of dual-CPU parallel processing, the computer coupling device of the invention 100 will connect the CPU 11 on the notebook computer 10 to the CPU 21 on the desktop computer 20 to allow the two CPUs 11, 21 to communicate with each other during the execution of a dual-CPU parallel processing task.

Referring to FIG. 2, the computer coupling device of the invention 100 includes an arbiter 110, a first Host interface 111, a first cache interface 112, a first PCI interface 113, a first main memory interface 114, a first system functions unit 115 (which includes a clock function, a reset function, a test function, and a power management function), a second Host interface 121, a second cache interface 122, a second PCI interface 123, a second main memory interface 124, a second system functions unit 125 (which also includes a clock function, a reset function, a test function, and a power management function).

The arbiter 110 has a first common bus 110a and a second common bus 110b and is connected to the CPU 11 on the notebook computer 10 and the CPU 21 on the desktop computer 20.

The first Host interface 111 has a first I/O port and a second I/O port, with the first I/O port being connected to the Host bus 12 of the notebook computer 10 and the second I/O port being connected to the first common bus 110a. The first cache interface 112 has an I/O port connected to the first common bus 110a. The PCI interface 113 has a first I/O port and a second I/O port, with the first I/O port being connected to the PCI bus 13 of the notebook computer 10 and the second I/O port being connected to the first common bus 110a. The first main memory interface 114 has an I/O port connected to the first common bus 110a. The first system functions unit 115 has an I/O port connected to the first common bus 110a.

The second Host interface 121 has a first I/O port and a second I/O port, with the first I/O port being connected to the Host bus 22 of the desktop computer 20 and the second I/O port being connected to the second common bus 110b. The second cache interface 122 has an I/O port connected to the second common bus 110b. The second PCI interface 123 has a first I/O port and a second I/O port, with the first I/O port being connected to the PCI bus 23 of the desktop computer 20 and the second I/O port being connected to the second common bus 110b. The second main memory interface 124 has an I/O port connected to the second common bus 110b. The second system functions unit 125 has an I/O port connected to the second common bus 110b.

In use, when the user is operating the notebook computer 10 and wants to gain access to any of the system resources of the desktop computer 20, the request is sent to the computer coupling device of the invention 100. In response, the arbiter 110 will connect the Host bus 12 and the PCI bus 13 of the notebook computer 10 respectively to the Host bus 22 and the PCI bus 23 of the desktop computer 20, thereby allowing the notebook computer 10 to gain access to any of the system resources of the desktop computer 20. Under this condition, the computer coupling device of the invention 100 will take over the Host-to-PCI bridge 14 in the notebook computer 10 and the Host-to-PCI bridge 24 in the desktop computer 20 for the control of the main memory units 15, 25, the cache memory units 16, 26, and the PCI buses 13, 23 in the two computer systems 10, 20. In other words, when the coupling is activated, the computer coupling device of the invention 100 presides over the notebook computer 10 in such a manner that the access to the cache memory unit 16 is instead controlled by the first cache interface 112; the PCI bus 13 is instead controlled by the first PCI interface 113; the access to the main memory unit 15 is instead controlled by the first main memory interface 114. Similarly, the computer coupling device of the invention 100 presides over the desktop computer 20 in such a manner that the access to the cache memory unit 26 is instead controlled by the second cache interface 122; the PCI bus 23 is instead controlled by the second PCI interface 123; and the access to the main memory unit 25 is instead controlled by the second main memory interface 124.

On the other hand, when the user wants the function of dual-CPU parallel processing, the request is sent to the computer coupling device of the invention 100. In response, the arbiter 110 will connect the CPU 11 of the notebook computer 10 to the CPU 21 of the desktop computer 20 so as to allow the two CPUs 11, 21 to communicate with each other for exchange of data during the execution of each dual-CPU parallel processing task. The function of dual-CPU parallel processing can be easily achieved by using the operating system of the two computer systems 10, 20, such as Windows NT, Windows 2000, or UNIX, to control the two CPUs 11, 21 for dual-CPU parallel processing.

In conclusion, the invention provides a computer coupling device for coupling two computer systems together to allow each computer system to share the system resources of the other, and also to allow the respective CPUs of the coupled computer systems to be combined to perform the function of dual-CPU parallel processing.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A computer coupling device for use to couple a first computer system to a second computer system, with each of the first and second computer systems including a CPU, a Host bus, and a PCI bus, for the purpose of allowing each of the first and second computer systems to share the system resources of the other and the two respective CPUs on the first and second computer systems to be combined to perform the function of dual-CPU parallel processing;

the computer coupling device comprising:
an arbiter having a first common bus and a second common bus and connected to the respective CPUs, Host buses, and PCI buses of the first and second computer systems;
a first Host interface having a first I/O port and a second I/O port, with the first I/O port being connected to the Host bus of the first computer system and the second I/O port being connected to the first common bus;
a first cache interface having an I/O port connected to the first common bus;
a first PCI interface having a first I/O port and a second I/O port, with the first I/O port being connected to the PCI bus of the first computer system and the second I/O port being connected to the first common bus;
a first main memory interface having an I/O port connected to the first common bus;

a second Host interface having a first I/O port and a second I/O port, with the first I/O port being connected to the Host bus of the second computer system and the second I/O port being connected to the second common bus;

a second cache interface having an I/O port connected to the second common bus;

a second PCI interface having a first I/O port and a second I/O port, with the first I/O port being connected to the PCI bus of the second computer system and the second I/O port being connected to the second common bus; and a second main memory interface having an I/O port connected to the second common bus;

wherein when the first computer system wants to gain access to the system resources of the second computer system, the arbiter connects the Host bus and the PCI bus of the first computer system respectively to the Host bus and the PCI bus of the second computer system;

and wherein when a dual-CPU parallel processing task is desired, the arbiter connects the CPU of the first computer system to the CPU of the second computer system.

2. The computer coupling device of claim 1, wherein the first computer system is a notebook computer.

3. The computer coupling device of claim 1, wherein the second computer system is a desktop computer.

4. The computer coupling device of claim 1, wherein the first and second main memory interfaces are each a DRAM interface.

* * * * *